US010575290B2

(12) United States Patent
Parkvall et al.

(10) Patent No.: US 10,575,290 B2
(45) Date of Patent: Feb. 25, 2020

(54) SCHEDULING OF TRANSMISSIONS IN RADIO ACCESS NETWORKS

(71) Applicant: Telefonaktiebolaget LM Ericsson (publ), Stockholm (SE)

(72) Inventors: Stefan Parkvall, Bromma (SE); Robert Baldemair, Solna (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/295,347

(22) Filed: Mar. 7, 2019

(65) Prior Publication Data
US 2019/0208519 A1    Jul. 4, 2019

Related U.S. Application Data

(63) Continuation of application No. PCT/SE2017/050473, filed on May 10, 2017.

(51) Int. Cl.
*H04W 72/04* (2009.01)
*H04L 1/18* (2006.01)
*H04L 5/00* (2006.01)
*H04L 27/26* (2006.01)

(52) U.S. Cl.
CPC ....... *H04W 72/0413* (2013.01); *H04L 1/1861* (2013.01); *H04L 5/0092* (2013.01); *H04L 27/2602* (2013.01)

(58) Field of Classification Search
None
See application file for complete search history.

(56) References Cited

U.S. PATENT DOCUMENTS

| 10,231,220 | B2* | 3/2019 | Hwang | H04L 5/00 |
| 10,498,516 | B2* | 12/2019 | Baldemair | H04L 5/0055 |
| 2017/0367046 | A1* | 12/2017 | Papasakellariou | H04L 5/0048 |
| 2018/0124815 | A1* | 5/2018 | Papasakellariou | H04W 72/1268 |
| 2018/0220415 | A1* | 8/2018 | Yin | H04W 72/0413 |
| 2018/0242349 | A1* | 8/2018 | Noh | H04W 72/1278 |
| 2018/0279327 | A1* | 9/2018 | Ying | H04L 5/0044 |
| 2018/0310257 | A1* | 10/2018 | Papasakellariou | H04W 52/30 |

OTHER PUBLICATIONS

International Search Report dated Jan. 15, 2018 for International Application No. PCT/SE2017/050473 filed on May 10, 2017, consisting of 9-pages.
3GPP TSG RAN WG1 Meeting #89 R1-1707729; Title: Multiplexing between PDCCH and PDSCH for various data durations; Agenda Item: 7.1.3.1.3; Source: AT&T; Document for: Discussion/Approval; Location and Date: Hangzhou, P.R. China, May 15-19, 2017, consisting of 6-pages.
3GPP TSG RAN WG1#89 R1-1708522; Title: PDSCH scheduling timing in NR; Agenda Item: 7.1.3.3.1; Source: Nokia, Alcatel-Lucent Shanghai Bell; Document for: Discussion and Decision; Location and Date: Hangzhou, P.R. China, May 15-19, 2017, consisting of 3-pages.

* cited by examiner

*Primary Examiner* — Steve R Young
(74) *Attorney, Agent, or Firm* — Christopher & Weisberg, P.A.

(57) ABSTRACT

There is disclosed a method of operating a user equipment in a radio access network. The method includes determining, based on a symbol configuration, a border symbol of a scheduled transmission in a transmission timing structure, the transmission timing structure comprising a plurality of symbols. The disclosure also pertains to related methods and devices.

9 Claims, 3 Drawing Sheets

SCHEDULING OF TRANSMISSIONS IN RADIO ACCESS NETWORKS

CROSS-REFERENCE TO RELATED APPLICATION

This application is a continuation of International Application No. PCT/SE2017/050473, filed May 10, 2017, the entirety of which is incorporated herein by reference.

TECHNICAL FIELD

This disclosure pertains to wireless communication technology, in particular in the context of $5^{th}$ generation technology according to 3GPP ($3^{rd}$ Generation Partnership Project, a standardization organization), like New Radio (NR) technology.

BACKGROUND

Modern wireless communication technology, in particular NR, aims at a broad range of use cases, requiring corresponding communication systems and networks to allow flexibility in signaling. Flexibility, however, might come at the price of increases signaling, in particular control signaling, which may lead to undesired signaling overhead.

SUMMARY

It is an object of the present disclosure to provide approaches allowing flexible signaling with limited overhead, in particular in the context of scheduling signaling. The approaches described herein are particularly useful for Radio Access Networks (RAN) according to 5G standards, in particular NR.

Accordingly, there is described a method of operating a user equipment in a radio access network. The method comprises determining, based on a symbol configuration, a border symbol of a scheduled transmission in a transmission timing structure, the transmission timing structure comprising a plurality of symbols. The method may also comprise communicating based on the determined border symbol.

Moreover, a user equipment for a radio access network is proposed. The user equipment is adapted for determining, based on a symbol configuration, a border symbol of a scheduled transmission in a transmission timing structure. The transmission timing structure comprises a plurality of symbols. The user equipment may also be adapted for communicating based on the determined border symbol. The user equipment may comprise, and/or be adapted for utilizing, processing circuitry and/or radio circuitry, e.g. a transmitter and/or transceiver and/or receiver, for such determining and/or communicating. Alternatively, or additionally, the user equipment may comprise a determining module for the determining, and/or a communicating module for the communicating.

Communicating based on a determined border symbol may be transmitting signaling with the border symbol representing a border of the transmission (e.g., starting symbol or ending symbol), or receiving (or expecting or preparing to receive) a transmission with the border symbol representing a border of the transmission (e.g., starting symbol or ending symbol). Such communicating may in particular comprise associating the transmission with a channel, e.g. transmitting the channel, or receiving the channel, to which the scheduled transmission pertains or for which it is scheduled.

There may also be considered a method of operating a network node in a radio access network. The method comprises configuring a user equipment with a symbol configuration. The symbol configuration indicates a border symbol of a scheduled transmission in a transmission timing structure comprising a plurality of symbols.

Furthermore, a network node for a radio access network is described. The network node is adapted for configuring a user equipment with a symbol configuration. The symbol configuration indicates a border symbol of a scheduled transmission in a transmission timing structure comprising a plurality of symbols. The network node may comprise, and/or be adapted for utilizing, processing circuitry and/or radio circuitry, in particular a transmitter and/or transceiver, for such configuring. Alternatively, or additionally, the network node may comprise a configuring module for such configuring.

The symbol configuration may be used to indicate a border symbol, in particular independent and/or in lieu of (e.g., physical layer) downlink control signaling comprising scheduling information. In particular, the symbol configuration may be configured a plurality of transmission timing structures (e.g., slots) before the scheduled transmission in time, e.g. 3 or more, or 5 or more or 7 or more or 10 or more transmission timing structures before.

Alternatively or additionally, a configuration, on particular the symbol configuration, may be configured to be valid for a plurality of scheduled transmissions, e.g. 2 or more, 4 or more, or 8 or more, and/or to be valid for an unspecified time or number of transmission timing structures (e.g., until changed or revoked by other configuring), and/or a number of transmission timing structures larger than 2, or 4, or 6 or 10, and/or for at least a radio frame comprising 10 or more slots. Alternatively, or additionally, it may be considered that the configuration is valid for a plurality of scheduled transmissions which are scheduled for transmission in disjunct transmission timing structures. Scheduled transmissions may be periodic and/or quasi-periodic, e.g. in the time of validity of the configuration/schedule. Any such configuration may be considered an example of a semi-persistent (also referred to a semi-static) configuration, which in particular may be based on and/or configured by RRC layer signaling, or in some cases by MAC layer signaling.

A configuration, like a symbol configuration and/or resource configuration, may schedule transmissions, e.g. for the time/transmissions it is valid, and/or transmissions may be scheduled by separate signaling or separate configuration, e.g. separate RRC signaling and/or downlink control information signaling. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

Disjunct transmission timing structures may be structures/time intervals between which are arranged other transmission timing structures for which the device is not scheduled for transmission, at least on the channel the scheduled transmission pertains to. There may be one or more such structures between structures for which transmission is scheduled. It should be noted that in such structures transmission may be scheduled for other channels and/or communication directions, or for other devices or cells.

A scheduled transmission may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation.

A symbol configuration may be a configuration indicating a border symbol, e.g. represented or configured with corresponding configuration data. A symbol configuration may be embedded in, and/or comprised in, a message or configuration or corresponding data, which may indicate and/or schedule resources, in particular semi-persistently and/or semi-static. The border symbol may be indicated implicitly or explicitly. The border symbol may for example be indicated by indicating a structure reference symbol, and/or offset or shift (which may pertain to such a reference symbol) based on which the border symbol may be determined, e.g. utilizing other information, e.g. configured with the same or another configuration, e.g. as downlink control information. A structure reference symbol may be a border symbol, e.g. starting symbol, for the scheduled transmission or of the transmission timing structure, or an end symbol of a control region, for example. Such a structure reference symbol may pertain to a symbol of the (e.g., underlying for synchronization) transmission timing structure.

In some variants, the symbol configuration is configured with control signaling, in particular Radio Resource Control layer control signaling, and/or is semi-persistently configured, and/or is predefined.

It may be considered that the scheduled transmission represents transmission on a physical channel, in particular a shared physical channel, for example a physical uplink shared channel or physical downlink shared channel. For such channels, semi-persistent configuring may be particularly suitable.

The border symbol may be determined in relation to a structure reference symbol of the transmission timing structure, for example the first symbol of the transmission timing structure, or a symbol of a control region within the transmission timing structure.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol of the transmission timing structure may generally be dependent on a numerology and/or carrier, wherein the numerology and/or carrier may be configurable. The numerology may be the numerology to be used for the scheduled transmission.

In some variants, the symbol configuration indicates a set of one or more symbols, the border symbol being selectable from the set. The border symbol may be selectable based on control signaling, in particular DCI signaling, which may indicate, e.g., index or point to, which of the symbols of the set is to be used as border symbol. In general, the border symbol may be additionally determined based on downlink control information, which may be comprised in and/or represented by such control signaling.

The symbol configuration may be part of, and/or signaled in, a resource configuration, e.g. in the same message as such a configuration. A resource configuration may be a configuration scheduling resources and/or one or more scheduled transmissions, which may be scheduled for a plurality of different transmissions and/or transmission timing structures, in particular semi-persistently.

In some variants, the symbol configuration and/or an associated resource configuration is or are valid for a duration of a plurality of transmission timing structures, in particular 5 or more, or 7 or more, or 10 or more transmission timing structures, in particular slots.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g., in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbol. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component.

A border symbol may generally indicate a border of a scheduled transmission in time, and/or within a transmission timing structure. A transmission timing structure may comprise a plurality of symbols, and/or define an interval comprising several symbols (respectively their associated time intervals). A reference to a symbol may be interpreted to refer to the time domain projection or interval or component of the symbol, unless it is clear from the context that the frequency domain component also has to be considered. A border symbol may generally be a starting symbol or ending symbol. A starting symbol may be the (scheduled, and/or in some cases actual) first symbol of a corresponding transmission, and/or the symbol in which the transmission starts. An ending symbol may be the (scheduled, and/or in some cases actual) last symbol of a corresponding transmission, and/or the symbol in which the transmission end. Generally, a border symbol may be determined and/or be indicated by a timing reference or another symbol, to which it may have a fixed or known (e.g., predefined or configured) relation, for example a center symbol of the transmission, or another border symbol of a transmission having a fixed or known (e.g., predefined or configured) length in time (duration). A duration may be measured in symbol time intervals (or symbol time lengths or durations) and/or in time units like SI units.

A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronization structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot. The symbol/s and timing structures referred to herein may be such as seen by the user equipment, which may be shifted in time (e.g., due to propagation) relative to the network node's point of view.

A border symbol, in particular a starting symbol, may be determined in relation to a timing structure grid, and/or in relation to a scheduled transmission timing structure like a slot or mini-slot, and/or a first or starting symbol of a transmission timing structure, and/or to a control region, in particular the end of a control region. A symbol configuration, or a resource configuration, may indicate the symbol and/or structure and/or grid the border symbol is determined in relation to, and/or may indicate an offset or shift (e.g., in number of symbols) in relation to a corresponding symbol to identify or indicate the border symbol. In some variants, a symbol configuration and/or resource configuration may indicate a length in time or duration of a scheduled transmission, e.g. for a specific channel, which may indicate the length in terms of number of symbols. Thus, with one border symbol and the length indicated or configured, the time extension for the scheduled transmission may be considered to be determined. An individual scheduled transmission may be a transmission covering or scheduled for a successive number of symbols (e.g., associated to the same channel), which may be without intermediate symbol associated to another channel or not being associated to the same channel. It should be noted that a scheduled transmission may extend in frequency space over a one or more subcarriers or resource blocks, and/or be multiplexed in frequency with other scheduled transmissions in the same time interval.

There is also discussed a program product comprising instructions causing processing circuitry to control and/or perform a method as described herein.

Moreover, a carrier medium arrangement carrying and/or storing a program product as described herein may be considered.

The approaches described herein allow in particular semi-persistent configuration of border symbols, in particular for channels, e.g. PUSCH and/or PDSCH. This enables flexible signaling with little overhead. The user equipment may efficiently be configured to handle communication on such channels, with the correct border/s associated to the channel.

BRIEF DESCRIPTION OF THE DRAWINGS

The drawings are provided to illustrate concepts and approaches described herein, and are not intended to limit their scope. The drawings comprise.

DETAILED DESCRIPTION

By way of example, it is referred specifically to NR technology in the following. NR uses the notion of slots to describe various transmissions and timing relations, wherein a slot may be considered an example of a transmission timing structure. A NR slot or associated interval may comprise, or consist of, 7 or 14 OFDM symbols (in particular time). In addition, the concept of mini-slots has been agreed. A mini-slot is shorter than a slot and may start at any OFDM symbol in a slot interval (start at any symbol within a transmission timing structure). Thus, there can be multiple mini-slots in a slot interval, and a UE may be instructed to receive (or transmit) on several mini-slots in the same slot interval (within the same transmission timing structure).

To schedule a transmission, for example a data transmission (data referring in particular to user data and/or user plane data), downlink control information (DCI) can be sent to a UE using a PDCCH. The UE monitors for PDCCH transmissions directed to the UE (and/or for other control information) and, if found, follows the indications detected, e.g. the DCI detected in the PDCCH. This is used for dynamically scheduled transmissions, i.e. transmissions where the network, typically for each slot interval, schedules a UE to transmit and/or receive data.

In addition to dynamic scheduling, semi-persistent scheduling can also be used. The benefit of semi-persistent scheduling is to reduce DCI overhead as regularly repeated scheduling occasions does not need to be scheduled dynamically for each slot. In some variants, for multiple, e.g. periodic scheduled transmissions, the first transmission may be scheduled using DCI, and as part of the DCI it is indicated to the UE that the following transmissions follow the semi-persistently configured periodicity, but otherwise uses the dynamically signaled DCI information such as modulation scheme, transport block size, etc.

Figure 1:
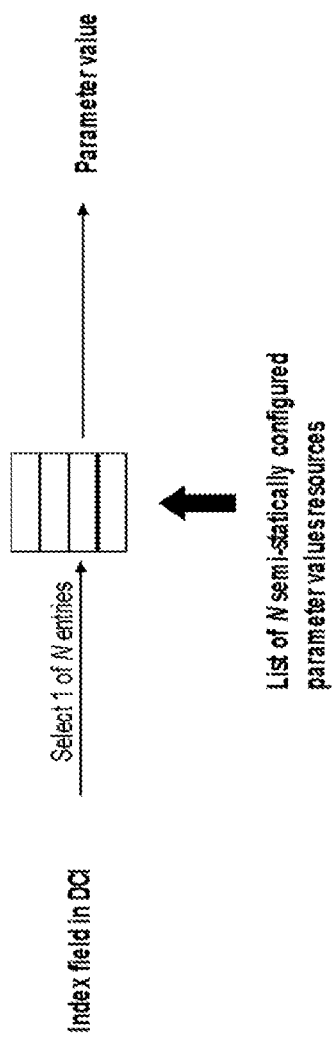
FIG. 1, schematically showing a combination of dynamic and semi-static signaling of a parameter value, for example a symbol configuration or indication.

In particular for scheduled transmissions like downlink data transmission on PDSCH or uplink data transmission on PUSCH, the UE needs to know where the data is supposed to start. A combination of dynamic signaling on the PDCCH and semi-static RRC signaling may be considered, for example such that timing between DL assignment and corresponding DL data transmission is indicated by a field in the DCI from a set of values. The set of values may represent or indicate a set of border symbols. The same may apply for UL data transmission. This can be thought of as configuring at table. The dynamic part of the timing information in the DCI may be used as an index into the table (representing a set) to obtain the starting position of the PUSCH/PDSCH. This approach is illustrated in FIG. 1.

Timing of the data transmission may be defined relative some reference point, e.g. the start of the slot interval or the time of successful reception of the DCI, or another reference, e.g. a reference symbol. A symbol configuration may generally indicate such a reference point, which may be represented by a structure reference symbol.

Defining the timing relative the DCI is preferred as the same structure can be used regardless of where in a slot the mini-slot occurs. However, for semi-persistent scheduling there may be no PDCCH or corresponding DCI to use as the timing reference.

It is thus proposed including, in the semi-static configuration signaling, information on the time reference/structure reference symbol (e.g., the start of the slot or the start or end of the PDCCH/associated control region), wherein the time reference may be used when determining the PDSCH/PUSCH data timing, in particular a border symbol like a starting symbol of PDSCH/PUSCH transmission.

Accordingly, reduced downlink control signaling overhead and simplified design are facilitated.

It may be considered that, when configuring the semi-persistent scheduling (e.g., with a periodicity) using RRC signaling, information about the timing reference is included in the configuration, in a symbol configuration. This timing reference (which may be considered to indicate a structure reference symbol) can be used in conjunction with the timing information in the DCI triggering the semi-persistent scheduling to derive where data transmissions (and/or transmission on a shared channel, e.g. PUSCH or PDSCH) are scheduled to start in each of the semi-persistently scheduled slots. Alternatively, the semi-persistent configuration may directly include information about the starting position of the data transmission for semi-persistently scheduled transmissions. Alternatively, a semi-persistent DL transmission may always start in the symbol after the configured control channel region. The length of control channel region (and/or its end symbol) could be a semi-static configuration, or the UE may determine it from a (e.g., dynamically scheduled) group control channel (e.g., a multicast channel), such as a group common PDCCH. Alternatively, a semi-persistent transmission may have hardcoded start position fixed in the spec, e.g. starting after the longest configurable control region (such that it may be predefined).

Alternatively, or additionally, when configuring the table of timing entries (see e.g. FIG. 1), each entry may be configured with information whether the starting position of the data is relative to the PDCCH reception or the start of the slot. This approach could be used for dynamically scheduled PDSCH/PUSCH (using DCI), but also in mix dynamic scheduling/semi-persistent scheduling. For example, some DCI time indices or indications may refer to starting positions relative to PDCCH carrying the DC (the control region), while other DCI time indices or indications may refer to starting positions relative to the slot interval/transmission timing structure. To which they refer, may be configured for example with a symbol configuration.

Dynamic configuration or scheduling may generally refer to configuring with downlink control information and/or with physical layer signaling, and/or with information pertinent to, or valid for, one or a few (e.g., less than 11 or less than 10 or less than 5 or less than 4) transmission timing structures, in particular slots.

Figure 2:
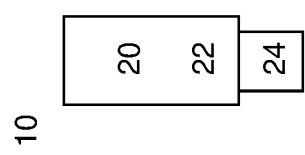
FIG. 2, showing an exemplary terminal or user equipment.

FIG. 2 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 3:
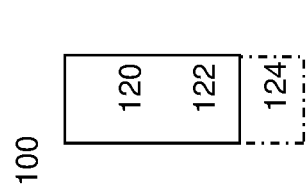
FIG. 3, showing an exemplary radio node like a network node.

FIG. 3 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry

124 may be connected to and/or comprise an antenna array. The node 100, respectively its circuitry, may be adapted to perform any of the methods of operating a network node or a radio node as described herein.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes.

Uplink or sidelink signaling may be OFDMA (Orthogonal Frequency Division Multiple Access) or SC-FDMA (Single Carrier Frequency Division Multiple Access) signaling.

Downlink signaling may in particular be OFDMA signaling. However, signaling is not limited thereto (Filter-Bank based signaling may be considered one alternative).

Different formats of for control information or control signaling may be considered, e.g. different formats for a control channel like a Physical Uplink Control Channel (PUCCH). PUCCH may carry control information or corresponding control signaling, e.g. Uplink Control Information (UCI), which may comprise acknowledgement signaling like HARQ feedback (ACK/NACK), and/or Channel Quality Information (CQI), and/or Scheduling Request (SR). One of the supported PUCCH formats may be short, and may e.g. occur at the end of a slot interval. Similar control information may be provided on a sidelink, e.g. as Sidelink Control Information (SCI), in particular on a (physical) sidelink control channel, like a (P)SCCH.

A radio node may generally be considered a device or node adapted for wireless and/or radio (and/or microwave) frequency communication, and/or for communication utilizing an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node. Transmitting in sidelink may pertain to (direct) transmission from on terminal to another. Uplink, downlink and sidelink (e.g., sidelink transmission and reception) may be considered communication directions.

Signaling may generally comprise one or more signals and/or one or more symbols. Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Transmitting signaling, in particular control signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol for transmitting or an ending symbol for receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilizing microwave and/or millimeter and/or other frequencies, in particular between 100 MHz or 1 GHz, and 100 GHz or 20 or 10 GHz. Such communication may utilize one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of or associated to a symbol. Accordingly, different symbols may have different symbol time lengths.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilize TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilizing a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilizing the sidelink for communication (respectively, for signaling). Sidelink transmission and/or transmitting on a sidelink may be considered to comprise transmission utilizing the sidelink, e.g. associated resources and/or transmission formats and/or circuitry and/or the air interface. Sidelink reception and/or receiving on a sidelink may be considered to comprise reception utilizing the sidelink, e.g. associated resources and/or transmission formats and/or circuitry and/or the air interface. Sidelink control information (e.g., SCI) may generally be considered to comprise control information transmitted utilizing a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

ACK Acknowledgment
ARI ACK/NACK Resource Indicator
CCE Control Channel Element
DCI Downlink Control Information
DL Downlink
DTX Discontinued Transmission
HARQ Hybrid Automatic Repeat Request
MIMO Multiple Input Multiple Output
NACK Negative Acknowledgment
OFDM Orthogonal Frequency Division Multiplexing
PAPR Peak to Average Power Ratio
PDCCH Physical Downlink Control CHannel
PDSCH Physical Downlink Shared CHannel
PUCCH Physical Uplink Control CHannel
PUSCH Physical Uplink Shared CHannel
RE Resource Element
RB Resource Block
RBG Resource Block Group
RRC Radio Resource Control
SC-FDM Single-Carrier Frequency Division Multiplexing
SL Sidelink
UE User Equipment
UL Uplink These abbreviations may be used according to 3GPP standard language usage, if applicable.

What is claimed is:

1. A method of operating a user equipment in a New Radio, NR, radio access network, the method comprising:
   determining, based on a predefined symbol configuration, a starting symbol of a scheduled transmission pertaining to a physical uplink control channel, PUCCH, carrying uplink control information comprising HARQ feedback in a transmission timing structure, the transmission timing structure representing a time interval corresponding to a substructure of a slot and comprising a plurality of symbols,
   the predefined symbol configuration being available in a memory of the user equipment without a configuration from a network node,
   the predefined symbol configuration indicating a set of more than one symbol, the starting symbol being selectable from the set of more than one symbol that is indicated by the predefined symbol configuration, and
   the starting symbol additionally being determined based on downlink control information indicating which of the symbols of the set is to be used as a starting symbol, a bit pattern comprised in the downlink control information and a resource used for transmitting the downlink control information indicating which of the symbols of the set is to be used as the starting symbol; and
   transmitting the uplink control information on the PUCCH based on the determined starting symbol.

2. The method according to claim 1, wherein the duration of a symbol of the transmission timing structure is dependent on a numerology, the numerology being configurable.

3. The method according to claim 1, wherein the symbol configuration is valid for a duration of a plurality of slots.

4. A user equipment for a New Radio, NR, radio access network, the user equipment comprising processing circuitry, the user equipment being configured to utilize the processing circuitry to:
   determine, based on a predefined symbol configuration, a starting symbol of a scheduled transmission pertaining to a physical uplink control channel, PUCCH, carrying uplink control information comprising HARQ feedback in a transmission timing structure, the transmission timing structure representing a time interval corresponding to a substructure of a slot and comprising a plurality of symbols,
   the predefined symbol configuration being available in a memory of the user equipment without a configuration from a network node,
   the predefined symbol configuration indicating a set of more than one symbol, the starting symbol being selectable from the set of more than one symbol that is indicated by the predefined symbol configuration, and
   the starting symbol additionally being determined based on downlink control information indicating which of the symbols of the set is to be used as a starting symbol, a bit pattern comprised in the downlink control information and a resource used for transmitting the downlink control information indicating which of the symbols of the set is to be used as the starting symbol; and to
   transmit the uplink control information on the PUCCH based on the determined starting symbol.

5. The user equipment according to claim 4, wherein the duration of a symbol of the transmission timing structure is dependent on a numerology, the numerology being configurable.

6. The user equipment according to claim 4, wherein the symbol configuration is valid for a duration of a plurality of slots.

7. A network node for a New Radio, NR, radio access network, the network node comprising processing circuitry, the network node being configured to utilize the processing circuitry to:
   communicate with a user equipment based on a predefined symbol configuration, the predefined symbol configuration indicating a starting symbol of a transmission to be scheduled, the transmission pertaining to a physical uplink control channel, PUCCH, carrying uplink control information comprising HARQ feedback in a transmission timing structure comprising a plurality of symbols,
   the predefined symbol configuration being available in a memory of the user equipment without a configuration from a network node,
   the predefined symbol configuration indicating a set of more than one symbol, the starting symbol being selectable from the set of more than one symbol that is indicated by the predefined symbol configuration; and
   transmit, to the user equipment, downlink control information indicating which of the symbols of the set is to be used as a starting symbol for transmission of the uplink control information on the PUCCH by the user equipment, a bit pattern comprised in the downlink control information and a resource used for transmitting the downlink control information indicating which of the symbols of the set is to be used as the starting symbol.

8. The network node according to claim 7, wherein the duration of a symbol of the transmission timing structure is dependent on a numerology, the numerology being configurable.

9. The network node according to claim 7, wherein the symbol configuration is valid for a duration of a plurality of slots.

* * * * *

UNITED STATES PATENT AND TRADEMARK OFFICE
CERTIFICATE OF CORRECTION

PATENT NO. : 10,575,290 B2  
APPLICATION NO. : 16/295347  
DATED : February 25, 2020  
INVENTOR(S) : Parkvall et al.

Page 1 of 1

It is certified that error appears in the above-identified patent and that said Letters Patent is hereby corrected as shown below:

In the Specification

In Column 10, Line 35, delete "formats of for" and insert -- formats for --, therefor.

In Column 11, Line 10, delete "Circuitry)" and insert -- Circuits) --, therefor.

In Column 11, Line 11, delete "Array)," and insert -- Arrays), --, therefor.

In Column 12, Line 1, delete "transmission from on" and insert -- transmission from one --, therefor.

In Column 15, Line 2, delete "indication," and insert -- indication), --, therefor.

In Column 15, Line 11, delete "carrier)" and insert -- carrier --, therefor.

Signed and Sealed this  
Eighth Day of December, 2020

Andrei Iancu  
*Director of the United States Patent and Trademark Office*